UNITED STATES PATENT OFFICE.

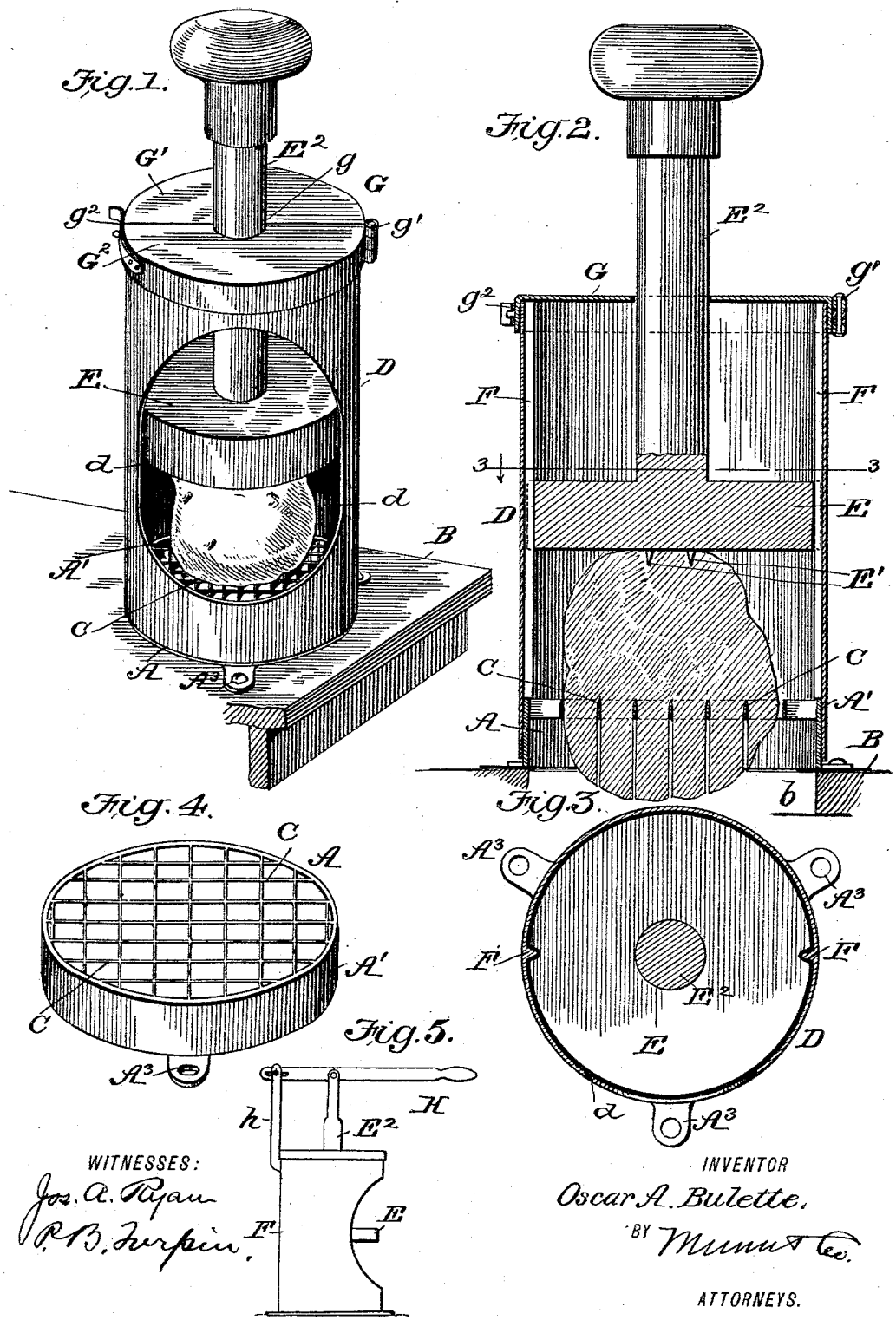

OSCAR A. BULETTE, OF SEATTLE, WASHINGTON.

POTATO-CUTTER.

SPECIFICATION forming part of Letters Patent No. 563,652, dated July 7, 1896.

Application filed January 25, 1896. Serial No. 576,798. (No model.)

*To all whom it may concern:*

Be it known that I, OSCAR A. BULETTE, residing at Seattle, in the county of King and State of Washington, have invented a new and useful Improvement in Potato-Cutters, of which the following is a specification.

This invention is an improved potato-cutter, and has for an object to provide a simple easily-operated construction by which potatoes may be cut into longitudinal blocks, the blades of the cutter being so disposed that they will cut all sides of the blocks of potatoes, so that the discharged blocks will be cut on all sides, insuring a uniform shape of block as well as avoiding all feather-edges, which have a tendency to crinkle and also to become too crisply cooked before the entire block has been cooked to the desired degree. In securing this result I form the cutter with a number of series of blade-sections, the blade-sections of each series being arranged to constitute a continuous circuit whereby to cut all sides of the vegetable block, as will be more fully described.

The invention consists in certain novel constructions and combinations of parts, as will be hereinafter described, and pointed out in the claim.

In the drawings, Figure 1 is a perspective view of my improved cutter as in use. Fig. 2 is a vertical longitudinal section thereof. Fig. 3 is a cross-section on about line 3 3, Fig. 2. Fig. 4 is a perspective view of the cutter, and Fig. 5 shows a lever arrangement for operating the plunger.

The cutter A forms an important part of my invention and as shown is formed with a ring A', having at its lower end lateral lugs $A^2$, perforated to receive screws by which the cutter may be secured to a bench, table, stand, or other support B, having an opening $b$ concentric with the ring A', as will be understood from Figs. 1 and 2. This ring A' supports and is crossed by the blade-sections C, which are composed of a set of parallel blades and a second set of parallel blades crossing the first set at right angles, the two sets thus providing a number of series of sections forming closed squares, as best shown in Fig. 4, the four sides of such squares making a continuous circuit which will cut all sides of the vegetable block. Now this is important, as it is desirable to furnish these vegetable blocks cut on all sides, and a special advantage results from making them in square or approximately square cross-sectional shape, as thereby I avoid any thin feather-edge and am able to secure a uniform cooking of the vegetable blocks.

In making the cutter its rim, blade-sections, and lugs $A^2$ may be cast integral, of aluminium or other suitable material, or the blade-sections may be formed separately and suitably secured to the ring A'. The casing D is made in cylindrical form, fits at its lower end upon the ring A', and may be made to bind so tightly thereon as to prevent accidental displacement. In one side of this casing I form the inlet-opening $d$ sufficiently large to permit the introduction of a potato between the cutter and the plunger E when the latter is suitably raised. This plunger E is movable vertically within the casing and is provided with notches $e$, which slide upon vertical guide-ribs F, provided within the casing D. These ribs F prevent any turning of the plunger within the casing, and in order to prevent the potato from turning beneath the plunger I provide the latter with a number of depending prongs E', which enter the potato, as will be understood from Fig. 2. By these means I am able to force the potato straight downward upon the cutters without any twisting whatever of such potato, and so secure an even uniform cutting, as desired.

The cap G has a central opening $g$ for the plunger-rod $E^2$ and is made in sections G' and $G^2$, hinged together at $g'$ and provided at $g^2$ with a latch by which they may be secured together upon the plunger-rod and upon the top of the casing or may be readily opened to permit the removal of the plunger-rod when desired.

From the foregoing it will be seen that the several parts may be detached in order that they may be thoroughly cleaned.

In Fig. 5 I show the plunger-rod $E^2$ connected with the lever H, pivoted to a bracket $h$, illustrating one of many ways in which the lever may be used to operate the plunger.

Having thus described my invention, what I claim, and desire to secure by Letters Patent, is—

The improved vegetable-cutter herein described consisting of the ring inclosing the cutter, the cylindrical casing fitted at its lower end upon said ring and provided on its inner side above said ring with longitudinal guide-ribs and also having above said cutter-ring a lateral inlet-opening, the plunger movable in said cylindrical casing, engaged with the guide-ribs and having an extended plunger-rod, and the cap fitted on the open end of the casing and upon the plunger-rod, said cap being made in sections hinged together at one end and provided at their other ends with a latch by which they may be secured together upon the top of the casing or may be readily opened to permit the removal of the plunger when desired all substantially as and for the purposes set forth.

OSCAR A. BULETTE.

Witnesses:
P. B. TURPIN,
SOLON C. KEMON.